(12) United States Patent
Kim

(10) Patent No.: US 9,230,204 B2
(45) Date of Patent: Jan. 5, 2016

(54) IMAGE FORMING APPARATUS AND METHOD OF REDUCING POWER CONSUMPTION OF COMMUNICATION MODULE

(71) Applicant: SAMSUNG Electronics Co., Ltd., Suwon-si, Gyeonggi-do (KR)

(72) Inventor: Jeong-phil Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/908,026

(22) Filed: Jun. 3, 2013

(65) Prior Publication Data

US 2014/0098393 A1   Apr. 10, 2014

(30) Foreign Application Priority Data

Oct. 4, 2012 (KR) .......................... 10-2012-110338

(51) Int. Cl.
*G06F 3/12* (2006.01)
*G06K 15/00* (2006.01)

(52) U.S. Cl.
CPC .......... *G06K 15/4055* (2013.01); *G06F 3/1221* (2013.01); *G06F 3/1236* (2013.01); *G06F 3/1292* (2013.01); *Y02B 60/1271* (2013.01)

(58) Field of Classification Search
CPC ............. G06F 3/1221; G06K 15/4055; Y02B 60/1271
See application file for complete search history.

(56) References Cited

U.S. PATENT DOCUMENTS

| | | | | |
|---|---|---|---|---|
| 2002/0140963 A1* | 10/2002 | Otsuka | ......................... | 358/1.14 |
| 2008/0034240 A1* | 2/2008 | Park | ............................. | 713/323 |
| 2010/0157863 A1 | 6/2010 | Gong et al. | | |
| 2010/0182626 A1 | 7/2010 | Wu et al. | | |
| 2011/0306382 A1* | 12/2011 | Tsunoda | ....................... | 455/522 |

FOREIGN PATENT DOCUMENTS

| | | |
|---|---|---|
| EP | 1708439 | 10/2006 |
| EP | 2282583 | 2/2011 |
| JP | 2004-025590 | 1/2004 |

OTHER PUBLICATIONS

Extended European Search Report dated May 2, 2014 issued in EP Application No. 13181762.9.

* cited by examiner

*Primary Examiner* — Dov Popovici
(74) *Attorney, Agent, or Firm* — Staas & Halsey LLP

(57) ABSTRACT

An image forming apparatus and an image forming method include a communication interface to communicate with a terminal device, an image former to form an image of data provided from the terminal device through the communication, and a controller to determine whether there is an image forming job of the data during a preset time, and, when determining that no image forming job is received, changing a transmission cycle of a beacon signal sent to synchronize with the terminal device or to provide device information.

20 Claims, 7 Drawing Sheets

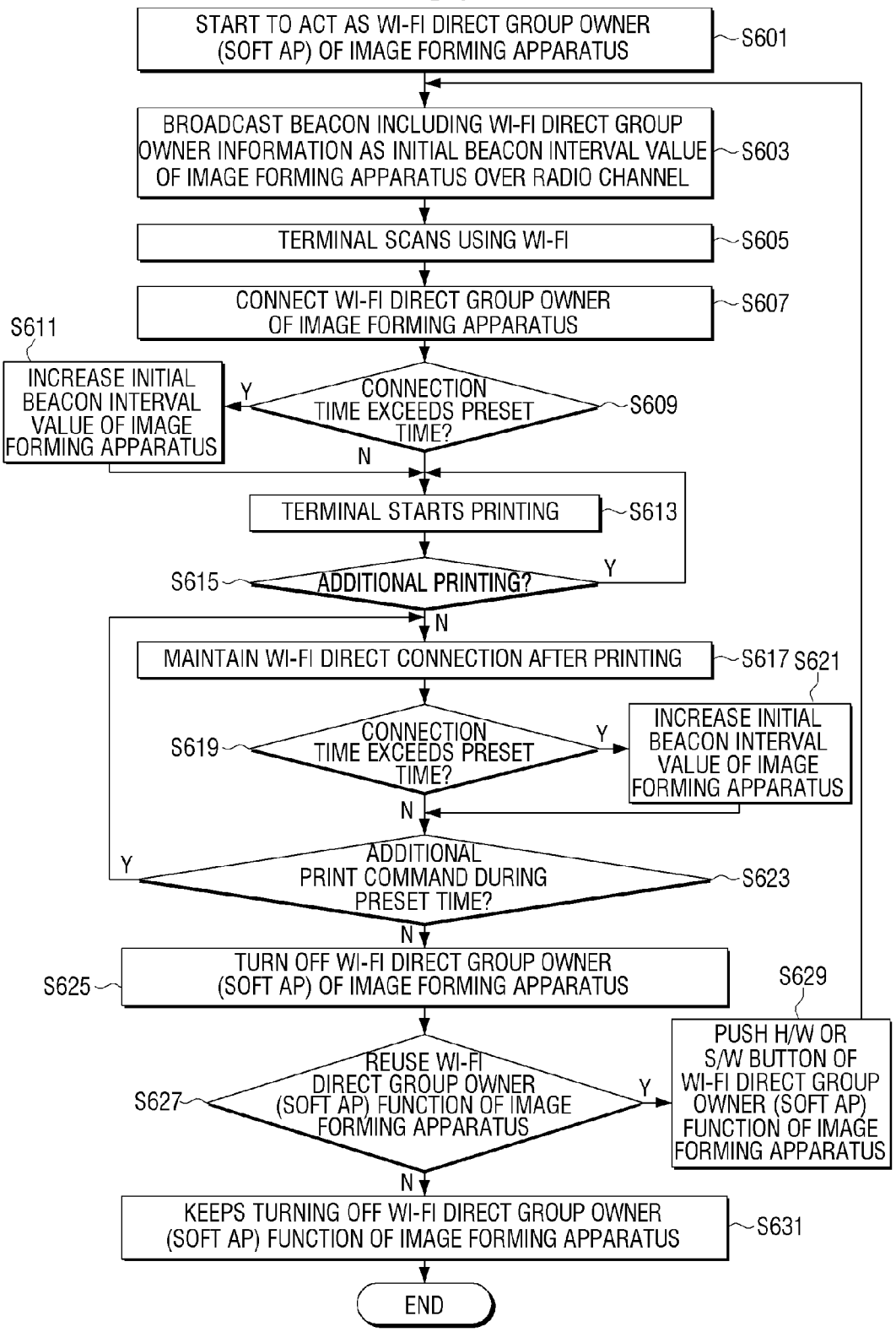

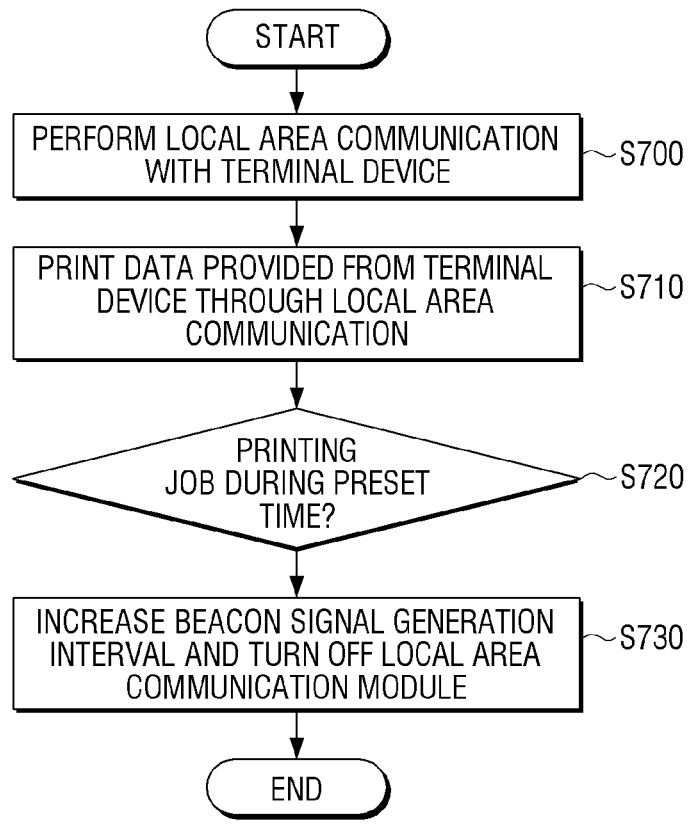

IMAGE FORMING APPARATUS AND METHOD OF REDUCING POWER CONSUMPTION OF COMMUNICATION MODULE

CROSS-REFERENCE TO RELATED APPLICATIONS

This application claims the benefit of priority under 35 U.S.C. §119 (a) from Korean Patent Application No. 2012-110338 filed on Oct. 4, 2012 in the Korean Intellectual Property Office, the entire disclosure of which is incorporated herein by reference.

BACKGROUND OF THE INVENTION

1. Field of the Invention

The present general inventive concept relates generally to an image forming apparatus and an image forming method. More particularly, the present general inventive concept relates to an image forming apparatus and an image forming method of reducing power consumption of the image forming apparatus when a terminal device, such as a mobile phone, is connected to the image forming apparatus using a local area communication scheme, such as Wi-Fi, and configures a wireless network.

2. Description of the Related Art

As mobile communication devices advance, mobile host devices such as mobile phones or personal digital assistants are propagated widely. The mobile phone has not only a basic phone call function but also functions for writing and storing a phone number, a memo, and a transmitted message.

Since the various functions of the mobile device can be used anywhere with mobility, the mobile device is increasingly used to store and manage information. For example, it is possible to store acquaintance's information including his/her phone number in the mobile phone and to retrieve or modify the stored information anytime. Recent mobile phones include a photographing function to store a photo together with the acquaintance information.

To print data stored to the mobile host device, a user can print the data by connecting the mobile host device to an image forming device. In this regard, Wi-Fi Direct transfers data through direct connection between mobile devices in association with the recent Wi-Fi technology.

That is, to print data using the Wi-Fi direct connection, the mobile host device performs the printing job by connecting to the image forming device acting as a Wi-Fi Direct group owner (soft AP) using the Wi-Fi Direct.

However, after the printing job is finished, the mobile host device connected to the image forming device using the Wi-Fi Direct maintains the Wi-Fi Direct connection and waits for a next printing job in the related art. As a result, power consumption of the image forming device increases.

SUMMARY OF THE INVENTION

The present general inventive concept provides an image forming apparatus and an image forming method of reducing power consumption of the image forming apparatus when a terminal device, such as mobile phone, is connected to the image forming apparatus using a local area communication scheme, such as Wi-Fi, and configures a wireless network.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus including a communication interface to communicate with a terminal device, an image former to form an image of data provided from the terminal device through the communication interface, and a controller to determine whether there is an image forming job of the data during a preset time, and, when determining no image forming job, changing a transmission cycle of a beacon signal sent to synchronize with the terminal device or to provide device information.

The controller may include a timer manager to determine whether print command data is received from the terminal device during the preset time, a beacon manager to generate the beacon signal, and a status change manager to instruct to increase a generation cycle of the beacon signal according to the determination result.

The controller may gradually increase a transmission cycle of the beacon signal, and turn off a function of the communication at a last level gradually increased.

The controller may include a Wi-Fi manager for processing a data packet received through the communication interface in conformity with a Wi-Fi communication standard, and the controller turns off the Wi-Fi manager to turn off the communication function.

The image forming apparatus may further include a user interface comprising a function return button for increasing the transmission cycle of the beacon signal or initializing an operation for turning off the communication function.

The user interface may include a display part for displaying the function return button in a form of an interface window.

The communication may be a Wi-Fi communication.

When determining no image forming job, the controller may change the beacon signal and additionally turns off the communication function.

When determining the image forming job, the controller may reduce the increased transmission cycle of the beacon signal.

The foregoing and/or other features and utilities of the present general inventive concept may also be achieved by providing an image forming method including communicating with a terminal device, forming an image of data received from the terminal device through the communication, determining whether there is an image forming job of the data from the terminal device during a preset time, and when it is determined that there is no image forming job, changing a transmission cycle of a beacon signal sent to synchronize with the terminal device or to provide device information.

The image forming method may further include generating the beacon signal; and instructing to increase a generation cycle of the beacon signal according to the determination result.

The changing operation may gradually increase a transmission cycle of the beacon signal, and turn off a function of the communication at a last level gradually increased.

The changing operation may include processing, at a Wi-Fi manager, a data packet received through the communication in conformity with a Wi-Fi communication standard, and the Wi-Fi manager may be turned off.

The image forming method may further include increasing the transmission cycle of the beacon signal, or initializing an operation for turning off the communication function. The initializing operation may be conducted by touching a function return button of a user interface.

The user interface may be a display part, and the function return button may be displayed on the display part in a form of an interface window.

The communication may be a Wi-Fi communication.

When determining no image forming job, the changing operation may change the beacon signal and additionally turn off the communication function.

When determining the image forming job, the changing operation may reduce the increased transmission cycle of the beacon signal.

The foregoing and/or other features and utilities of the present general inventive concept may also be achieved by providing an image forming apparatus including a communication interface to perform a local area communication with a terminal device, an image former to form an image of data provided from the terminal device through the local area communication, and a controller to determine whether there is an image forming job of the data during a preset time, and turning off a function of the local area communication when determining no image forming job.

The controller may include a Wi-Fi manager to process a data packet received through the communication interface in conformity with a Wi-Fi communication standard, and the controller may turn off the Wi-Fi manager to turn off the local area communication function.

The foregoing and/or other features and utilities of the present general inventive concept may also be achieved by providing a computer readable medium to contain computer-readable codes as a program to execute the method described above or hereinafter.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 6 is a flowchart illustrating an image forming method according to an embodiment of the present general inventive concept; and FIG. 7 is a flowchart illustrating an image forming method according to an embodiment of the present general inventive concept.

DETAILED DESCRIPTION OF THE PREFERRED EMBODIMENTS

Figure 1:
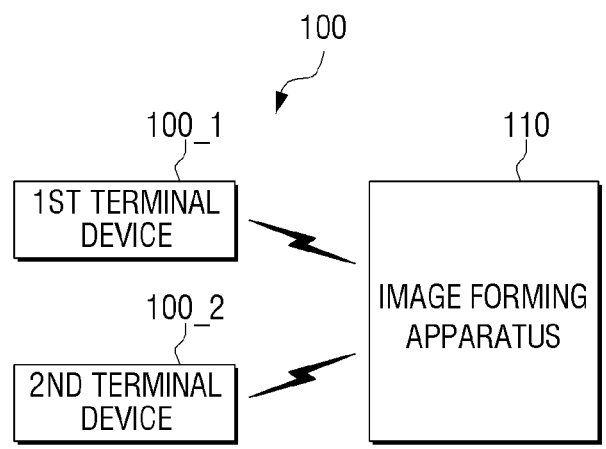
FIG. 1 is a diagram illustrating an image forming system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1 is a diagram illustrating an image forming system according to an embodiment of the present general inventive concept.

As illustrated in FIG. 1, the image forming system according to an embodiment of the present general inventive concept includes a terminal device 100 (100-1, 100-2) and an image forming apparatus 110, and can further include an Access Point (AP) and a server.

Herein, the terminal device 100 can include first and second terminal devices 100_1 and 100_2 to generate one or more signals to perform one or more different printing jobs. The terminal device 100 may be a mobile communication terminal, a tablet PC, a notebook, and so on. The terminal device 100 controls the image forming apparatus 110 to perform the printing job. For example, the terminal device 100 can control the image forming apparatus 110 to perform the printing job using a Wi-Fi Direct connection which directly connects with the image forming apparatus 110 through local area communication such as Wi-Fi. The terminal device 100 may generate or display a menu or an icon on a screen thereof to control the printing job by directly connecting with the image forming apparatus 110. Herein, for example, when the image forming apparatus 110 acts as the AP by activating a local area communication module thereof, the direct connection connects the terminal device 100 to the image forming apparatus 110 such that the image forming apparatus 110 sends a periodic beacon signal to synchronize with the terminal device 100 or to provide device information to the terminal device 100, and the terminal device 100 scans the beacon signal.

The terminal device 100 can include a program, for example, an application to control the printing job in association with the image forming apparatus 110. The application can be provided by accessing a separate server via an adjacent AP through wired or wireless communication, and may be implemented using a firmware. However, the present general inventive concept is not limited thereto. It is possible that the terminal device 100 stores the application in a different format or receives the application from an external device connectable to the terminal device 100.

The image forming apparatus 110 may be a printer, a copier, a fax machine, a scanner, or a multi-functional peripheral which incorporates functions of them in one device. When the image forming apparatus 110 configuring a wireless network acts as, for example, a Wi-Fi Direct group owner, the image forming apparatus 110 sends beacon information over a radio channel, and the terminal device 100 with or without a Wi-Fi Direct function accesses the image forming apparatus 110 by scanning the beacon information. In other words, when the image forming apparatus 110 acts as the Wi-Fi Direct group owner, the beacon signal carries Wi-Fi Direct group owner information of the image forming apparatus 110 over the radio channel at preset beacon intervals, and the terminal device 100 supporting the Wi-Fi Direct and the terminal device 100 not supporting the Wi-Fi Direct can discover and connect with the image forming apparatus 110 acting as the Wi-Fi Direct group owner.

The image forming apparatus 110 prints data received as the printing job, according to a print command transmitted from the connected terminal device 100. The image forming apparatus 110 determines whether a new print command is received from the terminal device 100 at a preset time or during a preset time period after a previous printing job is completed according to a previous print command. The preset time and the preset time period may be referred to as a preset time a predetermined period after a previous certain event time or a preset period between two times, respectively. However, the preset time and the preset time period may be interchangeably used. When not receiving the new print command during the preset time, the image forming apparatus 110 reduces a beacon signal transmission count by gradually increasing the interval of the beacon signal. The interval or the transmission cycle of the beacon signal is extended by one or more certain periods in order to avoid a case in which a terminal device does not discover or recognize the image forming apparatus 110 acting as the Wi-Fi Direct group owner when the beacon interval is abruptly or too shortened.

When finally determining that the print command is not received any more from the one or more terminal devices 100 directly connected during the preset time, the image forming apparatus 110 turns off, for example, the Wi-Fi Direct function and the Wi-Fi module. Hence, the image forming apparatus 110 can reduce its power consumption by disconnecting from the terminal device 100.

In addition, to reuse (reactivate or reinitiate) the Wi-Fi Direct function, the image forming apparatus 110 can include a button or a function return key to turn on the Wi-Fi module and the Wi-Fi Direct group owner function. The button can include both of a hardware (H/W) button and a software (S/W) button. Herein, the H/W button is formed on an exterior of the image forming apparatus 110, and the S/W button can be displayed on, for example, a screen of an interface window of the image forming apparatus 110. As the button is pushed or selected, initial setup value information of the Wi-Fi Direct stored to a storage unit, such as a DRAM memory unit, of the image forming apparatus 110 is loaded and thus the Wi-Fi Direct function operates according to the initial setup value information.

Figure 2:
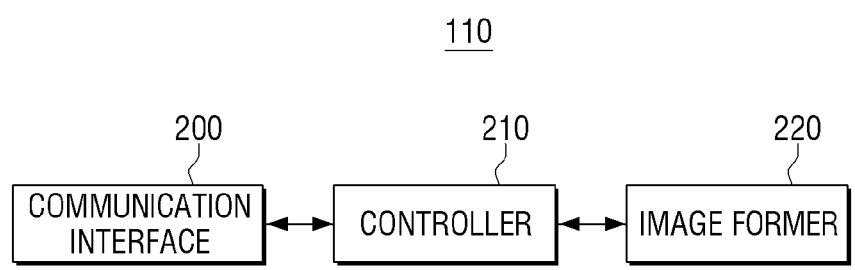
FIG. 2 is a block diagram illustrating an image forming apparatus of FIG. 1 according to an embodiment of the present general inventive concept.

FIG. 2 is a block diagram illustrating the image forming apparatus 110 of FIG. 1 according to an embodiment of the present general inventive concept.

Referring to FIGS. 1 and 2, the image forming apparatus 110 of FIG. 1 includes a communication interface 200, a controller 210, and an image former 220.

Herein, the communication interface 200 is configured to form a wireless network with the terminal device 100 according to a preset wireless communication standard (method). For example, the image forming apparatus 110 acting as the Wi-Fi Direct group owner can send the beacon signal to the terminal device 100 through the communication interface 200, and receive and forward the print command and the printing data from the terminal device 100 to the controller 210. The print command may be transmitted from the terminal device 100 separately from the printing data corresponding to the image of the printing job. However, it is possible that the print command includes the printing data, and the print command and the printing data may be simultaneously transmitted from the terminal device 100 to the image forming apparatus 110.

The controller 210 controls the operations of the communication interface 200 and the image former 220. More specifically, when the terminal device 100 is connected to the image forming apparatus 110 using, for example, the Wi-Fi Direct and then the image forming apparatus 110 does not receive the print command from the terminal device 100 over a certain time, the controller 210 gradually increases the transmission cycle of the beacon signal transmitted to the terminal device 100. When finally determining no reception of the print command, the controller 210 can turn off the Wi-Fi module and thus abort (terminate) the group owner function such that the image forming apparatus 110 can be disconnected from the terminal device 100.

Even after the disconnection, the controller 210 can return the disconnection state to the initial setup state according to, for example, a user's request. That is, when the user wants the image forming apparatus 110 to act as the group owner again and pushes (selects) the button, the controller 210 fetches the initial setup value stored to a memory thereof according to the corresponding request according to the button and operates the image forming apparatus 110 in the initial setup state according to the corresponding information.

Figure 3:
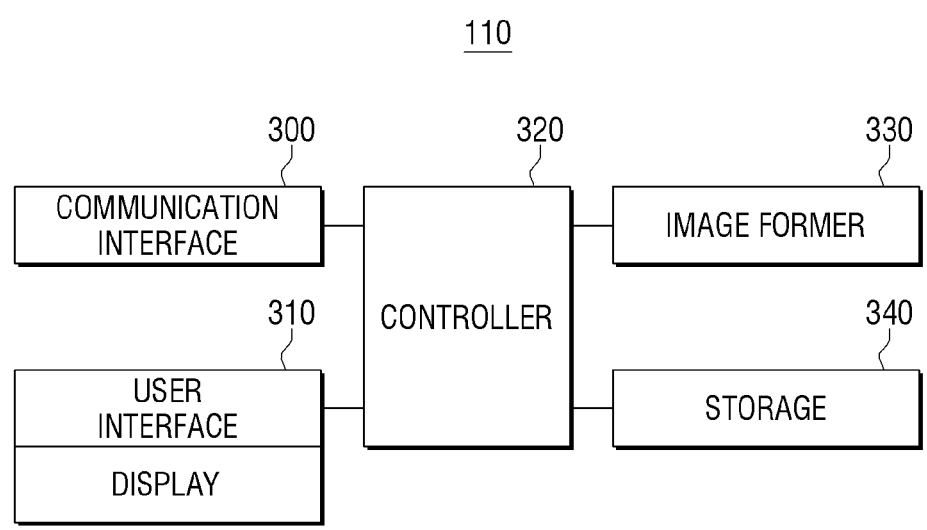
FIG. 3 is a block diagram illustrating the image forming apparatus of FIG. 1 according to an embodiment of the present general inventive concept.
Figure 4:
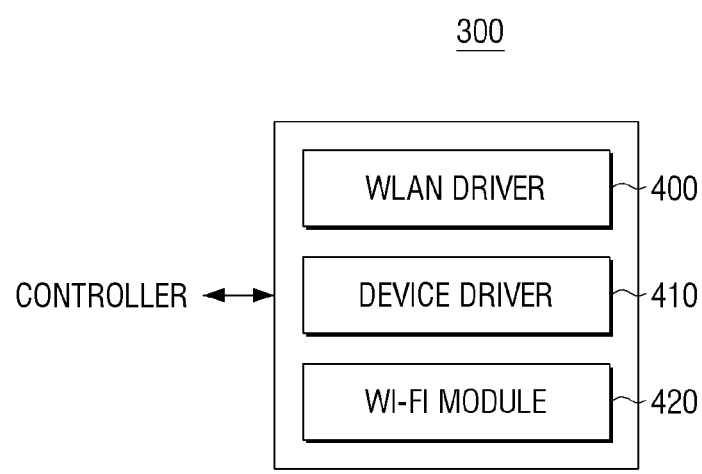
FIG. 4 is a block diagram illustrating a communication interface of the image forming apparatus of FIG. 3.
Figure 5:
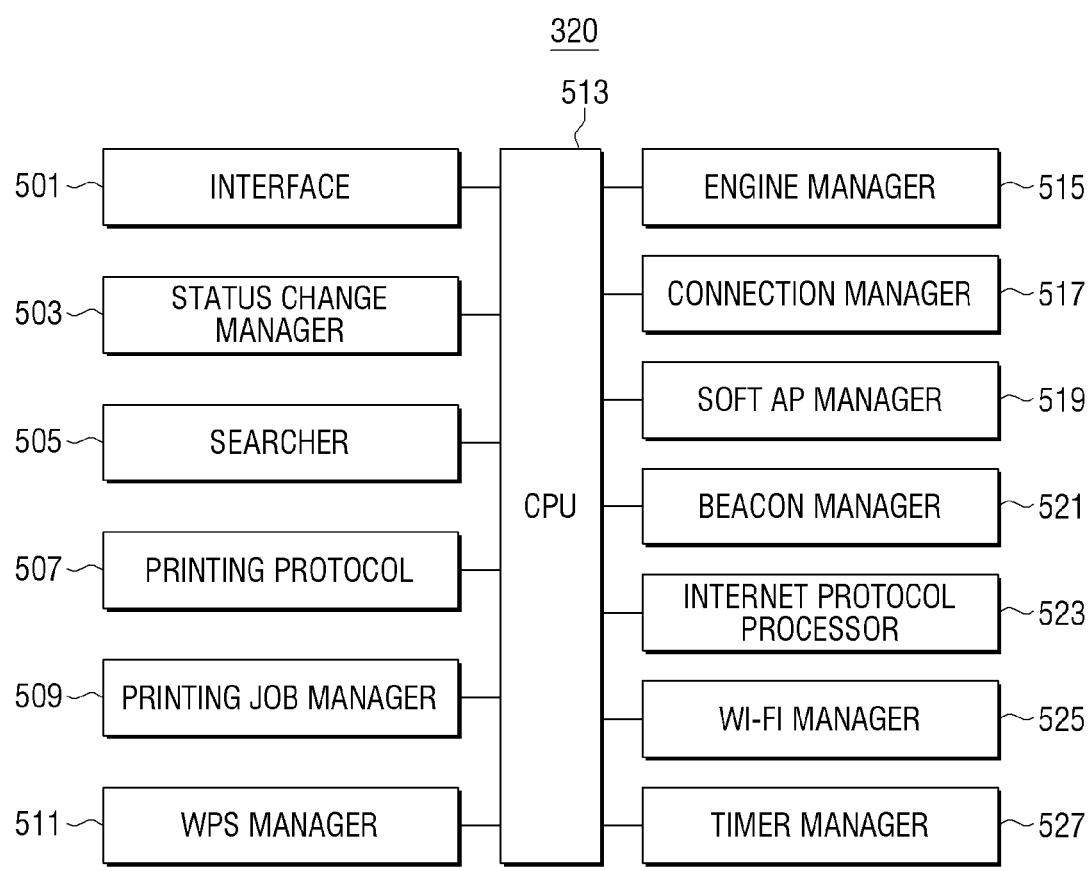
FIG. 5 is a block diagram illustrating a controller of the image forming apparatus of FIG. 3.

Detailed descriptions are provided by referring to FIGS. 3, 4 and 5.

FIG. 3 is a block diagram illustrating the image forming apparatus 110 of FIG. 1 according to an embodiment of the present general inventive concept, FIG. 4 is a block diagram illustrating the communication interface 300 of FIG. 3, and FIG. 5 is a block diagram illustrating the controller 320 of FIG. 3.

As illustrated in FIGS. 3, 4 and 5, the image forming apparatus 110 includes a portion or all of a communication interface 300, a user interface 310, a controller 320, an image former 330, and a storage 340, which signifies that some component can be omitted or integrated into other component. To facilitate the understanding, all of the components are included.

The communication interface 300 may perform the same functions as the communication interface 200 of FIG. 2. The communication interface 300 may include a wireless local area network (WLAN) driver 400, a device driver 410, and a Wi-Fi module 420 as illustrated in FIG. 4. The communication interface 200 of FIG. 2 may have structures and/or functions similar to the WLAN driver 400, the device driver 410, and the Wi-Fi module 420 of FIG. 4. Herein, the WLAN driver 400 can control the Wi-Fi module 420 by converting data received from a higher layer thereof to data recognizable by the Wi-Fi module 420 and sending the converted data to the Wi-Fi module 420 via the device driver 410. That is, the WLAN driver 400 receives data from the controller 320, converts the received data in conformity with the Wi-Fi standard, sends the converted data to an outside thereof, converts data received from the outside into a format recognizable by the controller 320, and sends the converted data to the controller 320. The WLAN driver 400 can directly turn on and off, for example, the Wi-Fi module 420. The device driver 410 is a component to drive the Wi-Fi module 420. The device driver 410 may be connected with the Wi-Fi module 420 through a Universal Serial Bus (USB) or Secure Digital Input/output (SDIO) interface, converts the data received from the higher layer in conformity with an interface standard, and sends the converted data to the Wi-Fi module 420. The data received from the Wi-Fi module 420 is forwarded to the WLAN driver 400. The Wi-Fi module 420 is a component to process a communication standard for the wireless communication such as IEEE 802.11 a/b/g/n. The Wi-Fi module 420 can directly control hardware for the wireless communication to process wireless connection and wireless data transmission and reception.

The user interface 310 of FIG. 3 can include a button to receive a user request, and a display to display status of the image forming apparatus 110. The button can indicate the H/W button, and the display can use an LCD screen or a simple Light Emitted Diode (LED) to thus display the S/W button on, for example, the interface window thereon. For example, through the user interface 310, the user can return the released Wi-Fi group owner operation of the image forming apparatus 110 to the initial setup state. That is, when the user wants the image forming apparatus 110 to act again as the group owner and pushes or selects the button to generate a request, the controller 320 fetches the initial setup value stored in the memory according to the corresponding request and operates the image forming apparatus 110 in the initial setup state according to the corresponding information.

The controller 320 controls the operations of the image forming apparatus 110. The controller 320 may include a portion or all of elements, for example, an interface 501, a status change manager 503, a searcher 505, a printing protocol 507, a printing job manager 509, a Wi-Fi Protected Setup (WPS) manager 511, a CPU 513, an engine manager 515, a connection manager 517, a soft AP manager 519, a beacon manager 521, an Internet protocol processor 523, a Wi-Fi manager 525, and a timer manager 527 as illustrated in FIG. 5 to control the operations of the image forming apparatus 110. It is possible that one or more elements of the controller 320 illustrated in FIG. 5 may be combined with one or more other elements of the controller 320 such that the combined elements can perform the corresponding functions and/or operation of the corresponding elements of the image forming apparatus 110.

The controller 320 can control a power unit (not illustrated), such as Switching Mode Power Supply (SMPS), and supply a warm-up power to each module or unit, in order to warm up not only a scanner module or a printer module but also the components of the image forming apparatus 110 for the sake of the immediate image forming job. When the warm-up is in process or completed, the controller 320 can generates a signal indicating information of this state through the display.

The interface 501 notifies a user of a connection state of the user or provides an interface to set network configuration information. For example, the interface 501 is included in the controller 320 in FIG. 5. That is, the interface 501 can include an input means and an output means, such as button of FIG. 2, and be formed on an exterior of the controller 320 with reference to FIG. 2. In this case, the interface 501 can generate and provide a Graphic User Interface (GUI) to interface with the user to the user interface 310 of FIG. 3. The interface 501 may be referred to as a GUI generator.

The status (or state) change manager 503 obtains information of a client (for example, the terminal device 100) accessing through the operations of the soft AP manager 519, through the connection manager 517. After the Wi-Fi Direct connection, when no printing job is determined during a certain time period counted (measured) by the timer manager 527, the status change manager 503 can turn off the Wi-Fi manager 525 and gradually increase the interval of the beacon signal generated by the beacon manager 521. When the Wi-Fi Direct connection function is turned off and a key signal to return the Wi-Fi Direct function according to the selection of the button is input, the status change manager 503 can initialize the Wi-Fi Direct function. The status change manager 503 may provide relevant information to the CPU 513 and perform the corresponding operation under control of, but not limited to, the CPU 513. In other words, the status change manager 503 may function as the CPU 513. In this case, the CPU 513 can be omitted.

The searcher 505 processes a discovery protocol for informing of a device accessing the wireless network or searching for other device accessed already.

The printing protocol 507 processes the printing data obtained over the network, according to a protocol. The printing protocol 507 may process the printing data using the protocol such as standard TCP/IP printing protocol (default 9100 port), Internet Printing Protocol (IPP) (631 port), and LinePRinter (LPR) (515 port).

The printing job manager 509 analyzes and converts the printing data received via the printing protocol 507 into a data format recognizable by the image former 330.

The WPS manager 511 processes information on WPS enrollee and WPS registrar. That is, when receiving a WPS connection request or a connection standby request from the connection manager 517, the WPS manager 511 generates a WPS packet in conformity with the WPS protocol. Hence, the WPS manager 511 sends the WPS packet via the WLAN driver 400 of FIG. 4 to transmit it to an external node. By contrast, when the WPS packet is received via the WLAN driver 400, the WPS manager 511 processes the WPS packet. Thus, the WPS access is conducted with the corresponding device.

The CPU 513 controls the operations of the components of the image forming apparatus 110. For example, the CPU 513 can gradually increase the beacon signal generation cycle by controlling the beacon manager 521 and turn off the module of the Wi-Fi manager 525 according to the request of the status change manager 503. That is, the CPU 513 can shut down the power supply to the corresponding module or component.

The engine manager 515 controls the image former 330. The engine manager 515 can control the image former 330 under the control of, for example, the CPU 513, to print an image corresponding to the data of the format converted by the printing job manager 509. When the warm-up is required for the image forming, the engine manager 515 can control the image former 303 to warm up.

The connection manager 517 controls the WPS manager 511, the soft AP manager 519, and the Wi-Fi manager 525 according to network configuration information, that is, WLAN configuration set through the interface 501. Hence, the connection manager 517 can generate a status (or state) check of a wireless device, a Wi-Fi Direct access request instruction, a WPS access instruction, and a WPS access standby. The connection manager 517 can control or drive the soft AP manager 519 to act as the AP.

The soft AP manager 519 serves as the AP. The soft AP manager 519 processes the access request from the external terminal device 100 of FIG. 1 using a routing table. The soft AP manager 519 manages a wireless communication group by periodically sending a message such as a beacon signal. When the client conducts the WPS access and the access request is received, the soft AP manager 519 can approve the request. Accordingly, the image forming apparatus 110 acts as the group owner and completes preparation for a TCP/IP communication with the client, that is, the terminal device 100, over the Wi-Fi network.

The beacon manager 521 can check information received from the timer manager 527 and change the beacon interval over a preset radio channel or return the beacon interval to an initial setup value.

The Internet protocol processor 523 processes and sends a TCP/IP packet to a higher layer thereof, or processes data received from the higher layer for a TCP/IP protocol and sends the data to the WLAN driver 400 of FIG. 4. The connection manager 517 can perform tethering using the Internet protocol processor 523.

The Wi-Fi manager 525 processes, for example, the Wi-Fi Direct communication standard. The Wi-Fi manager 525 generates a packet conforming to the Wi-Fi Direct standard according to an instruction from the connection manager 517. Hence, the Wi-Fi manager 525 sends the packet to the WLAN driver 400 of FIG. 4 to transmit the packet to the external terminal device 100 of FIG. 1. When receiving a packet from the WLAN driver 400, the Wi-Fi manager 525 parses and sends the received and/or parsed Wi-Fi Direct packet to the connection manager 517.

The timer manager 527 transmits to the status change manager 503 the information of checking whether the print command is received from one or more terminal devices 100 connected using the Wi-Fi Direct over the preset time after a previously performed printing. The timer manager 527 determines whether the preset time elapses by checking a Wi-Fi Direct connection time of the one or more terminal devices 100, and sends information to the beacon manager 521.

The image former 330 of FIG. 3 includes electrical and/or mechanical engine components for the image forming job. The image former 330 may be referred to as an engine, a print engine or a scanning engine, for example, and a detailed structure of the image former 330 can vary according to an image forming type of the image forming apparatus 110. For example, the image former 330 of a laser type can include a photoreceptor, a charging unit, an exposure unit, a developing unit, a transfer unit, and a fixing unit. The image former 330 of an inkjet type can include an ink cartridge and a printer head.

The storage 340 can store various information and programs. For example, the storage 340 can store access information, unique information, and signal strength information of clients, or history information such as usage frequency, usage count, access count, and access time, and threshold information. The storage 340, which is, for example, a DRAM memory, stores the initial setup value of the Wi-Fi Direct and outputs the corresponding stored information when the status change manager 503 requests under the control of the controller 320, more specifically, the CPU 513 so that the image forming apparatus 110 can return to the initial setup state after being disconnected from the Wi-Fi Direct.

FIG. 6 is a diagram illustrating an image forming method according to an embodiment of the present general inventive concept.

Referring to FIGS. 1, 2, 3 and 6, in the image forming method according to an embodiment of the present general inventive concept, the image forming apparatus 110 starts to act as, for example, the Wi-Fi Direct group owner at operation S601. Herein, the image forming apparatus 110 performs the Wi-Fi Direct group owner functions to serve as the AP and prepares for the local area communication with the adjacent terminal device 100.

The image forming apparatus 110 broadcasts the beacon signal including the Wi-Fi Direct group owner information as the set beacon interval value, over the radio channel at operation S603. The beacon interval value can be set according to a design or user preference.

The terminal device 100 scans the beacon signal broadcast by the image forming apparatus 110 at operation S605 and connects to the Wi-Fi Direct group owner, that is, the image forming apparatus 110 at operation S607. Herein, the scanning of the beacon signal in the terminal device 100 may include a process to recognize the image forming apparatus 110 as the group owner.

When the terminal device 100 is connected with the image forming apparatus 110, the image forming apparatus 110 determines whether the connection time exceeds a preset time period at operation S609.

When the connection time exceeds the preset time, the image forming apparatus 110 sends the beacon signal to the terminal device 100 by increasing the interval of the beacon signal at operation S611. When the connection time does not exceed the preset time, the image forming apparatus 110 performs the image forming job of the received data according to the print command of the terminal device 100 at operation S613.

The image forming apparatus 110 can determine whether an additional printing is performed at operation S615. Herein, the additional printing can be determined by checking whether data is received from the terminal device 100.

Upon determining the additional printing, the image forming apparatus 110 continues the image forming job. When determining no additional printing, the image forming apparatus 110 maintains the Wi-Fi Direct connection with the terminal device 100 at operation S617.

Next, the image forming apparatus 110 re-determines whether the connection time exceeds the preset time period at operation S619. When the connection time exceeds the preset time, the image forming apparatus 110 increases its initial beacon interval value at operation S621. When the connection time does not exceed the preset time, the image forming apparatus 110 determines whether an additional print command is issued during a preset time at operation S623.

Upon detecting the additional print command, the image forming apparatus 110 maintains the Wi-Fi Direct connection. When detecting no additional print command, the image forming apparatus 110 aborts (or terminate) the group owner operation at operation S625. Herein, the abortion of the group owner operation include shutting down the power supplied to the Wi-Fi module 420 to manage the Wi-Fi communication of FIG. 4 and the soft AP manager 519 or the Wi-Fi manager 525 to manage the group owner operation of FIG. 5, or turns off them. Thus, the power consumption can be reduced.

As such, as aborting the group owner operation, the image forming apparatus 110 can determine whether to reuse the Wi-Fi Direct group owner function at operation S627. For example, the image forming apparatus 110 can determine whether its H/W button or S/W button is pushed or selected at operation S629. Upon determining the selection of the H/W button or the S/W button, the image forming apparatus 110 performs the operation S603.

Without the reuse, the image forming apparatus 110 keeps turning off the Wi-Fi Direct group owner at operation S631. Next, the image forming apparatus 110 can terminate the system thereof.

FIG. 7 is a diagram illustrating an image forming method according to an embodiment of the present general inventive concept.

Referring to FIGS. 1, 2, 3 and 7, the image forming apparatus 110 performs the local area communication, for example, the Wi-Fi communication, with the terminal device 100 at operation S700. For the local area communication, the image forming apparatus 110 sends the beacon signal to act as the group owner for the Wi-Fi Direct connection over the radio channel, and the terminal device 100 accesses the image forming apparatus 110 by scanning the corresponding beacon signal. That is, the wireless network is formed between the image forming apparatus 110 and the terminal device 100. Next, the image forming apparatus 110 maintains the connection with the terminal device 100 by sending the beacon signal at regular time intervals.

The image forming apparatus 110 performs the image forming job based on the print command data from the terminal device 100. For example, the image forming apparatus 110 performs the image forming job of the data provided from the terminal device 100 through the local area communication such as Wi-Fi at operation S710.

The image forming apparatus 110 determines whether there is a new image forming job during a preset time at operation S720. For example, the image forming apparatus 110 drives a timer and thus determines whether a new print command is received from the terminal device 100 during a preset time.

When determining that no print command is received, the image forming apparatus 110 gradually increases the generation interval or the transmission cycle of the beacon signal sent to the terminal device 100. Next, when finally determining no reception of the print command data, the image forming apparatus 110 turns off the Wi-Fi Direct function and the local area communication module such as Wi-Fi at operation S730.

Although it is not illustrated in the drawing, the image forming apparatus 110 can re-operate the Wi-Fi Direct connection according to a user request. The initial setup value stored to the memory can be fetched to initialize the image forming apparatus 110.

The terminal device 100 may include a print driver to generate and output the printing data to the image forming apparatus 110. When the terminal device 100 generates and outputs compressed data, the image forming apparatus 110 can decompress the compressed data to generate printing data to form the image or to print the image on a print medium. However, the present general inventive concept is not limited thereto. It is possible that the printing data is generated and/or received from an external device.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
    a communication interface to communicate with a terminal device;
    an image former to form an image of data provided from the terminal device through the communication interface; and
    a controller to determine whether there is an image forming job of the data during a preset time, and, when determining that no new image forming job is received, to change a transmission cycle of a beacon signal being sent for a synchronization with the terminal device or to provide device information,
    wherein the controller gradually increases the transmission cycle of the beacon signal.

2. The image forming apparatus of claim 1, wherein the controller comprises:
    a timer manager to check whether a new print command is received from the terminal device during the preset time;
    a beacon manager to generate the beacon signal; and
    a state change manager to generate an instruction to increase a generation cycle of the beacon signal according to a check result.

3. The image forming apparatus of claim 1, wherein:
    the controller comprises a Wi-Fi manager to process a data packet received through the communication interface in conformity with a Wi-Fi communication standard; and
    the controller turns off the Wi-Fi manager to turn off a communication function.

4. The image forming apparatus of claim 3, further comprising:
    a user interface comprising a function return button to return an operation to increase the transmission cycle of the beacon signal or to turn off the communication function to an initial state.

5. The image forming apparatus of claim 4, wherein the user interface comprises:
    a display part to display the function return button in a form of an interface window.

6. The image forming apparatus of claim 1, wherein the communication interface is a Wi-Fi communication interface.

7. The image forming apparatus of claim 1, wherein, when determining that no new image forming job is received, the controller changes the beacon signal and additionally turns off a communication function.

8. The image forming apparatus of claim 1, wherein, when determining that the new image forming job is received, the controller reduces the increased transmission cycle of the beacon signal.

9. The image forming apparatus of claim 1, wherein the controller turns off a function of the communication interface at a last level gradually increased.

10. An image forming method comprising:
    communicating with a terminal device;
    forming an image of data received from the terminal device through the communication;
    determining whether there is an image forming job of the data from the terminal device during a preset time; and
    when determining that no new image forming job is received, changing a transmission cycle of a beacon signal being sent for a synchronization with the terminal device or for providing device information,
    wherein the changing of the transmission cycle of the beacon signal includes gradually increasing the transmission cycle of the beacon signal.

11. The image forming method of claim 10, further comprising:
    generating the beacon signal; and
    instructing to increase a generation cycle of the beacon signal according to a result of the determination.

12. The image forming method of claim 10, wherein the changing of the transmission cycle of the beacon signal operation comprises:
    processing, at a Wi-Fi manager, a data packet received through the communication in conformity with a Wi-Fi communication standard, and
    turning off the Wi-Fi manager.

13. The image forming method of claim 12, further comprising:
    returning an operation to increase the transmission cycle of the beacon signal, or to turn off a communication function to an initial set state,
    wherein the returning of the operation includes performing the returning by touching a function return button of a user interface.

14. The image forming method of claim 13, wherein:
the user interface is a display part: and the function return button is displayed on the display part in a form of an interface window.

15. The image forming method of claim 10, wherein the communication is a Wi-Fi communication.

16. The image forming method of claim 10, wherein, when determining that no image forming job is received, the changing of the transmission cycle of the beacon signal changes the beacon signal and additionally turns off the communication function.

17. The image forming method of claim 10, wherein, when determining that the image forming job is received, the changing of the transmission cycle of the beacon signal reduces the increased transmission cycle of the beacon signal.

18. The image forming method of claim 10, wherein the changing of the transmission cycle of the beacon signal includes turning off a function of the communication at a last level gradually increased.

19. An image forming apparatus comprising:
a communication interface to perform a direct connection by wireless communication with a terminal device;
an image former to form an image of data provided from the terminal device through the wireless communication; and
a controller to determine whether there is an image forming job of the data during a preset time, and to turn off a function of the direct connection by wireless communication of the image forming apparatus when determining that no image forming job is received.

20. An image forming apparatus comprising:
a communication interface to perform local area communication with a terminal device;
an image former to form an image of data provided from the terminal device through the local area communication; and
a controller to determine whether there is an image forming job of the data during a preset time, and to turn off a function of the local area communication of the communication interface when determining that no image forming job is received,
wherein:
the controller comprises a Wi-Fi manager to process a data packet received through the communication interface in conformity with a Wi-Fi communication standard; and
the controller turns off the Wi-Fi manager in order to turn off the local area communication function.

* * * * *